United States Patent
Salmikuukka et al.

(10) Patent No.: US 10,955,247 B2
(45) Date of Patent: Mar. 23, 2021

(54) ALLOCATION OF FACILITIES ON A ROUTE

(71) Applicant: KONE Corporation, Helsinki (FI)

(72) Inventors: Jukka Salmikuukka, Espoo (FI); Jere Vuorenala, Hyvinkää (FI); Kim Bergman, Helsinki (FI); Mika Belov, Tuusula (FI); Hannu Nousu, Helsinki (FI)

(73) Assignee: KONE Corporation, Helsinki (FI)

( * ) Notice: Subject to any disclaimer, the term of this patent is extended or adjusted under 35 U.S.C. 154(b) by 184 days.

(21) Appl. No.: 15/398,519

(22) Filed: Jan. 4, 2017

(65) Prior Publication Data

US 2017/0115122 A1    Apr. 27, 2017

Related U.S. Application Data

(63) Continuation of application No. PCT/FI2014/050556, filed on Jul. 4, 2014.

(51) Int. Cl.
| | | |
|---|---|---|
| *G01C 21/20* | (2006.01) | |
| *B66B 1/46* | (2006.01) | |
| *B66B 3/00* | (2006.01) | |

(52) U.S. Cl.
CPC ............ *G01C 21/206* (2013.01); *B66B 1/468* (2013.01); *B66B 3/006* (2013.01); *B66B 2201/4615* (2013.01); *B66B 2201/4638* (2013.01); *B66B 2201/4653* (2013.01)

(58) Field of Classification Search
None
See application file for complete search history.

(56) References Cited

U.S. PATENT DOCUMENTS

| | | | | |
|---|---|---|---|---|
| 2008/0236956 A1* | 10/2008 | Finschi | ................ | B66B 1/468 |
| | | | | 187/382 |
| 2010/0326773 A1* | 12/2010 | Mitsuda | ................ | B66B 1/2458 |
| | | | | 187/387 |
| 2012/0253658 A1* | 10/2012 | Kappeler | ................ | B66B 1/468 |
| | | | | 701/410 |

(Continued)

FOREIGN PATENT DOCUMENTS

| | | |
|---|---|---|
| CN | 102036896 A | 4/2011 |
| CN | 103261070 A | 8/2013 |

(Continued)

OTHER PUBLICATIONS

Extended European Searh Report issued in the corresponding European Patent Application No. 14896481, dated Jan. 30, 2018.

*Primary Examiner* — Kelly D Williams
(74) *Attorney, Agent, or Firm* — Birch, Stewart, Kolasch & Birch, LLP

(57) ABSTRACT

Elevators and other facilities in buildings and other constructed environments can be controlled remotely. In an advanced controlling method at least one person is guided through constructed environment along a predetermined route. When the route is known facilities, such as elevators, may be called or activated in advance so that the person guided along the route does not need to do it when arriving at the area of influence of the facility. When there are more than one person travelling the routes may be combined such that the central system controlling allocations of facilities may call or activate resources more than one person.

11 Claims, 2 Drawing Sheets

(56) References Cited

U.S. PATENT DOCUMENTS

2013/0103200 A1* 4/2013 Tucker ................ G01C 21/206
                                              700/275
2013/0245832 A1* 9/2013 Blom .................... H04W 4/029
                                              700/275

FOREIGN PATENT DOCUMENTS

| CN | 103476694 A | 12/2013 |
| EP | 2 704 105 A1 | 3/2014 |
| JP | 2002-117173 A | 4/2002 |
| JP | 2004-338864 A | 12/2004 |
| JP | 2012242370 A * | 12/2012 |
| KR | 10-2014-0051188 A | 4/2014 |
| WO | WO 00/40496 A1 | 7/2000 |
| WO | WO 2007/093665 A1 | 8/2007 |
| WO | WO 2009/130364 A1 | 10/2009 |
| WO | WO 2012/130729 A1 | 10/2012 |

* cited by examiner

ALLOCATION OF FACILITIES ON A ROUTE

CROSS REFERENCE TO RELATED APPLICATIONS

This application is a Continuation of PCT International Application No. PCT/FI2014/050556, filed on Jul. 4, 2014, the entire content of which is herein expressly incorporated by reference into the present application.

FIELD OF THE INVENTION

The invention relates to determining a route and guiding people along the route. Particularly the invention relates to controlling and allocating different facilities within the route.

BACKGROUND OF THE INVENTION

Many conventional solutions have been applied in order to improve the efficiency of personal transportation means, such as elevators. For example, elevators may be controlled by a destination control system, where a person places an order for one or more people into a desired floor before entering to the elevator car. Then the system allocates an elevator ride and instructs the caller and the possible group to the elevator. This guarantees the best possible throughput of the elevator system and reduces the time needed for travelling from a place to another.

Mobile devices are used for various purposes. One of the common uses is to navigate by using a map application in the mobile device. The conventional navigation is done in outdoor environment and based on using satellites for positioning, however, recently also indoor navigation has been implemented. Indoor navigation requires maps that are designed for indoor use. Guidance may be estimated or based on indoor positioning system. Thus, in advanced solutions involving indoor positioning system the guidance is comparable to traditional outdoor navigation and persons using such system find, for example, the correct elevator lobby easily.

As time is a valuable resource and also moving elevators and using other resources consumes energy there is always a need for systems that will lead into further time and energy savings.

SUMMARY

Elevators and other facilities in buildings and other constructed environments can be controlled remotely. In an advanced controlling method at least one person is guided through constructed environment along a predetermined route. When the route is known facilities, such as elevators, may be called or activated in advance so that the person guided along the route does not need to do it when arriving at the area of influence of the facility. When there are more than one person travelling the routes may be combined such that the central system controlling allocations of facilities may call or activate resources more than one person.

In an embodiment the invention is implemented as a method for guiding at least one person to a destination. In the method at least one destination from at least one person is received. Then route to the at least one received destination is computed. Based on the computed route a need for service requests within route is determined and at least one service request to at least one facility located on the route is sent. In a further embodiment the guiding of the at least one person to a destination involves guiding in indoors. In a further embodiment of the invention the request sent to facilities located on the route is a call for an elevator, preferably a group call involving call for a plurality of people with at least one destination. In a further embodiment of the invention the request sent to facilities located on the route is a request to one or more of the following: lighting, automatic doors, temporary access rights and electric locks. In a further embodiment of the invention routes for a plurality of people comprise a plurality of destinations. In an advanced embodiment a plurality of routes with different starting points and destinations are received and facilities are requested based on all received or computed routes. It must be understood that the allocation according the present invention works optimally for routes having different starting point and destination when they have common points during the journey. For example, two person coming from different locations and going to different destinations may be arriving at the same elevator lobby same time and the elevator call for two persons may be called.

In a further embodiment of the invention the method described above is implemented as computer software that is executed in a device capable of receiving destinations, computing routes, processing requests and sending processed requests to facilities. In an alternative embodiment the device receives a computed route and based on that route generates requests to be transmitted.

In a further embodiment the invention is implemented as an apparatus comprising at least one data communication connection for receiving and transmitting request, a processor for processing the requests, a memory for storing the requests and computer program code. The apparatus is configured to receive at least one destination from at least one person, compute at least one route to the received destination; send at least one service request to at least one facility located on the route and guide at least one person to the destination.

A benefit of the invention is that persons are able to reach their destinations faster and more conveniently when all necessary facilities are requested automatically without further interaction. A further benefit of the invention is that when the facilities are controlled centrally they can be used more efficiently and energy is then saved. For example, in case of elevators, a plurality of people can be combined to form groups for elevator rides. This may reduce the need for rides, which means that energy is saved as elevators move less.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
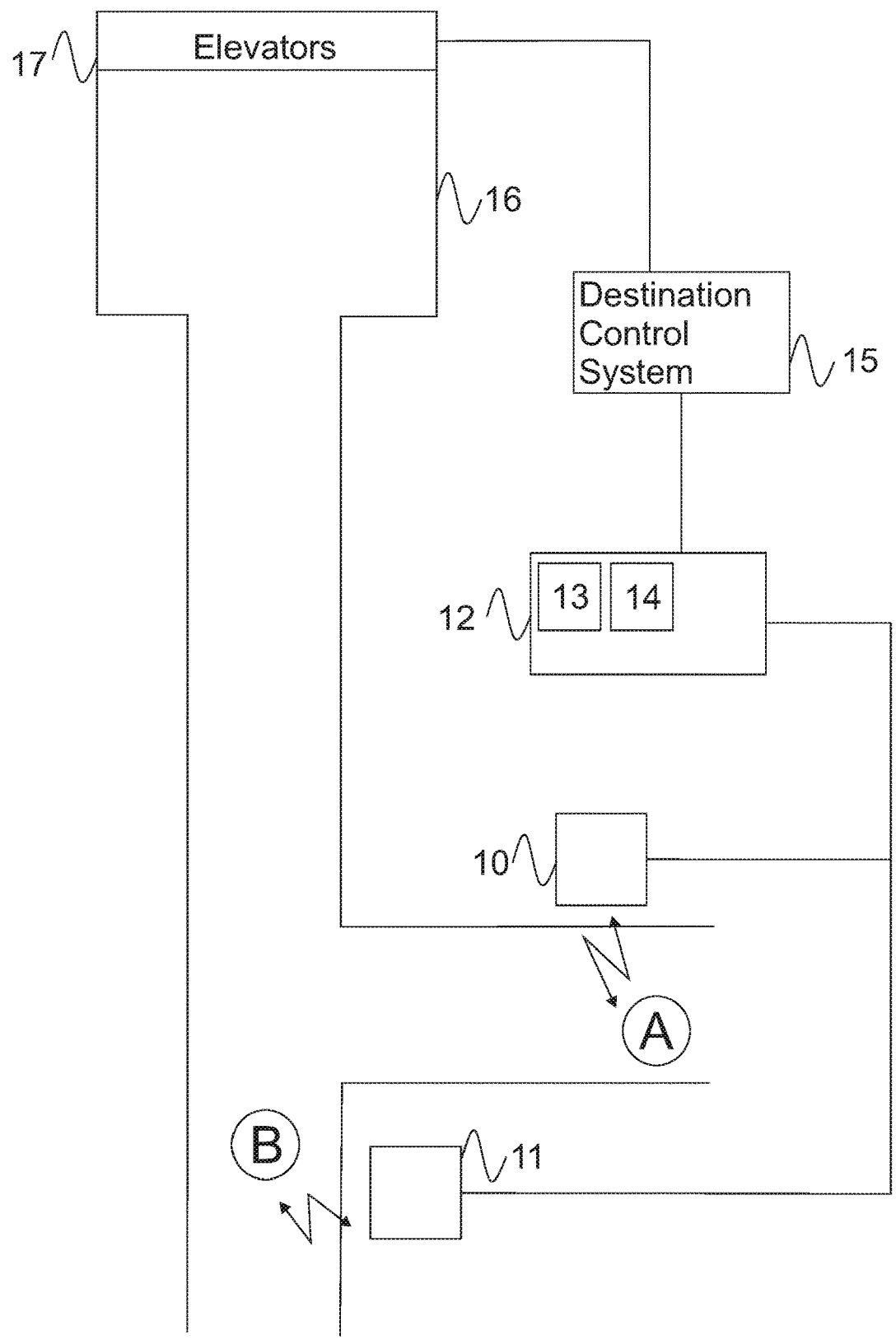
FIG. 1 is a block diagram of an example embodiment of the present invention.

In FIG. 1 a block diagram of an example embodiment of the present invention. The block diagram is illustrated together with a map of a building where the invention is used. FIG. 1 illustrates a situation where two persons A and B are heading to the same destination, for example, a common meeting in a meeting room. They both have mobile devices that are wirelessly connected to base stations 10 and 11. The wireless connection may be any suitable wireless connection, such as WiFi, Bluetooth, other local area wireless connection, microcell or an ordinary cell in a public mobile telephone network, or similar. The purpose of the base stations is to provide a possibility to transmit information to central system 12 and possibly locate persons A and B and to provide information of their movements to the central system 12. In an alternative embodiment the base stations 10 and 11 are beacons of an indoor positioning system and the information is sent by the mobile devices of persons A and B.

Central system 12 is configured to receive service requests from persons A and B. The service requests may include, for example, a call for an elevator 17 at elevator lobby 16. In addition to the service request the above described location information may be received together with location information as described above. In the example embodiment of FIG. 1 both of the persons wish transmit similar elevator call. The call is received at the central system 12, which includes at least one processor 13 for processing such requests and at least one memory 14 for storing the necessary data. When the central system 12 detects that persons A and B are going to the same destination and are arriving about same time at the elevator lobby 16, the system will place a group call of two persons to the same destination floor. The group call is placed at the destination control system 15. The central system 12 may then send a message to the persons A and B instructing them to take the correct elevator. The information may be communicated also by using other means, such as showing the message at the information screen at the elevator lobby 16.

Figure 2:
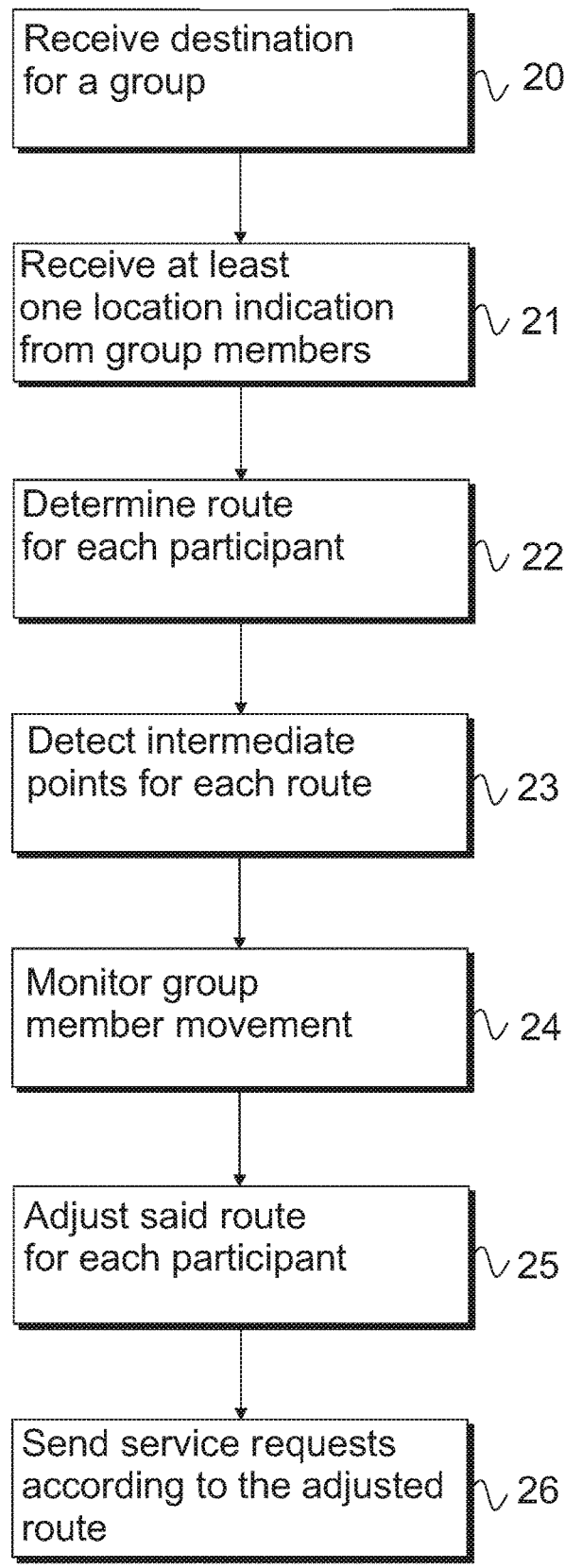
FIG. 2 is a flow chart of a method according to the present invention.

In FIG. 2 is a flow chart of a method according to the present invention is disclosed. The method is initiated by receiving a destination for a group at a central system responsible for executing the method, step 20. The message including the destination may include, in addition to the actual destination, such as a negotiation room, a plurality of participants and a desired moment of time. Thus, an example of such destination might be a calendar marking indicating a meeting for a small group of people. The calendar marking includes naturally a meeting room, identification of every participants and the time of the meeting. This message may be sent by any of the participants and it may be sent to the central system in advance. The system may compute the estimated travel time and instruct each person to leave on time.

When the destination is known persons participating to the meeting are guided to the meeting room. In order to do this the current location of the person to be guided needs to be known and is received at the system, step 21. The current location of the person may be derived by multiple means. In an advanced embodiment the location is received from an indoor positioning system. Sometimes it is possible to use conventional outdoor positioning systems, such as GPS, however, this requires that the satellites can be seen by the device, for example, through windows. If positioning means are not available one solution is that the person provides the location, for example, by checking the reminder message provided by the calendar program. If the checking is done at the normal work station, such as an office room, the system knows where the person is located.

When locations have been received, a route for each participants can be determined, step 22. It must be understood that locations are not necessarily received at the same time and the system and method according to the present embodiment may start functioning with a partial set of data before all destinations have been received. The location may be received from a plurality of different systems, for example from a user device, access control system or even garage gate or similar. Thus, even if the embodiment discusses mainly about indoor positioning in a building also other systems involving positioning outdoors or in another building may be involved. If the locations of each participant are not available it can be decided that the unknown locations are not taken into account before the location is received at a later stage in the route or a location may be assumed, for example, the office room or other place of work, such as previous meeting having a location known to the system. Furthermore, it should be understood that even if the present example discusses about a group having same destination, the system and method according to the present embodiment may and typically do receive routes from different people having completely different destinations and tries to combine that information with all existing known routes having common points in their routes. Furthermore, these common points in their routes should be more or less at the same time so that it will not cause unnecessary delays to guided people. The time range considered to be the same time may be chosen on embodiment basis.

After determining the route for each participant intermediate points are detected for each route, step 23. An intermediate point may be any point at the route, for example, an elevator or a door where a key needs to be introduced. When all routes are known and people are moving towards destination they are monitored by using indoor positioning system, other means for detecting location or estimating their location, step 24. When deviations from the known route are detected the routes of each participant are updated, step 25, in order to improve the accuracy of the model.

At the last step the system sends service requests according to the adjusted route 26, and provides corresponding instructions to persons following routes respectively. For example, when the route involves using an elevator with a destination control system, the system guiding persons may detect that three persons are arriving at a same elevator lobby in one minute and place an order for an elevator ride for three persons and to provide the instructions to the mobile device of the guided persons, for example, which elevator to take and how much time they have. A further example of a service request is lighting, wherein the system may know that three persons are moving in late evening through a corridor separately with small intervals. Thus, the lights in the corridor may be turned on just before the first person arrives to the corridor and turned off when the last person leaves the corridor. As the system knows estimated arrival times at the meeting room it can fine tune the routes and the functioning of the complete system based on this information. For example, the system may involve priorities for different people and if a person is detected to be early, or earlier than the other members of the team, then the priority may be lowered for persons being early and raised for people who are late. This may mean, for example, that when an elevator is known to arrive at the lobby the system may schedule that elevator even if it may mean little bit longer waiting time and let other elevators to pass the floor without stopping. This will minimize the waiting time at the meeting room and will increase throughput of personal transportation ways and tools in the building.

In a further embodiment of the invention the routes known by the central system 12 are combined with other routes belonging to different people and having a different destination. For example, if the central the system 12 illustrated in FIG. 1 notices that there are three persons arriving at the elevator lobby 16 about the same time one elevator for three people with two destinations may be called if the central system and/or the destination control system decides that if will be effective for the complete elevator system.

In a further embodiment of the invention the mobile device includes an application that computes the route and the computed route is then sent to the central system for further processing. A further optional feature is the possibility to compute an estimated time of arrival, which can be sent to the other persons belonging to the same group. Thus, if one person is late others will know how much longer they need to wait.

The above mentioned method may be implemented as computer software which is executed in a computing device, such as the central system 12 of FIG. 2, which is able to communicate with mobile devices and destination control systems. When the software is executed in a computing device it is configured to perform the above described inventive method. The software is embodied on a computer readable medium so that it can be provided to the computing device.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for guiding people to one or more destinations, the method comprising:
    receiving a destination from a plurality of people;
    computing, for each of the plurality of people, a route to the destination received therefrom;
    combining a plurality of the computed routes having common points in the routes;
    determining, for the combined route, a need for at least one service request to at least one facility located on the combined route;
    sending at least one request to at least one facility located on the combined route in accordance with the determined need for the at least one service request; and
    providing instructions to people on the combined route indicating the at least one service request, wherein
    sending the at least one request includes sending a group call for an elevator involving a call for a plurality of people with a common entrance point and differing destinations and the instructions provided to the people on the combined route include how much time they have to arrive at the elevator.

2. The method according to claim 1, further comprising:
    guiding at least one person from the plurality of people to the received destination, the guiding involving guiding the at least one person indoors.

3. The method according to claim 2, wherein the method further comprises sending instructions regarding made service requests to the at least one person guided to the received destination.

4. The method according claim 2, wherein sending the request to the at least one facility located on the combined route includes sending a request to one or more of the following: lighting, automatic doors, temporary access rights and electric locks.

5. The method according to claim 1, wherein sending the at least one request to the at least one facility located on the combined route includes sending a request to one or more of the following: lighting, automatic doors, temporary access rights and electric locks.

6. The method according to claim 5, wherein the method further comprises sending instructions regarding made service requests to the at least one person guided to the received destination.

7. A non-transitory computer readable medium having stored thereon a computer program that when executed by a processor causes the processor to
    receive a destination from a plurality of people;
    compute, for each of the plurality of people, a route to the destination received therefrom;
    combine a plurality of the computed routes having common points in the routes;
    determine, for the combined route, a need for at least one service request to at least one facility located on the combined route; and
    send at least one request to at least one facility located on the combined route in accordance with the determined need for at least one service request; and
    providing instructions to people on the combined route indicating the at least one service request,
    wherein sending the at least one request includes sending a group call for an elevator involving a call for a plurality of people with a common entrance point and differing destinations and the instructions provided to the people on the combined route include how much time they have to arrive at the elevator.

8. An apparatus comprising:
    at least one data communication connection for receiving and transmitting requests;
    a processor for processing the requests; and
    a memory for storing the requests and computer program code wherein the apparatus is configured to:
    receive a destination from a plurality of people;
    compute, for each of the plurality of people, at least one route to the destination received therefrom;
    combine a plurality of the computed routes having common points in the routes;
    determine, for the combined route, a need for at least one service request to at least one facility located on the combined route;

send at least one service request to at least one facility located on the combined route in accordance with the determined need for the at least one service request; and provide instructions to people on the combined route indicating the at least one service request, wherein the at least one service request is a group call for an elevator involving a call for a plurality of people with a common entrance point and differing destinations and the instructions provided to the people on the combined route include how much time they have to arrive at the elevator.

9. The apparatus according to claim 8, wherein the apparatus is further configured to guide at least one person from the plurality of people to the received destination, the guiding involving guiding the at least one person in indoors.

10. The apparatus according to claim 8, wherein the at least one service request includes a request to one or more of the following: lighting, automatic doors, temporary access rights and electric locks.

11. The apparatus according to claim 8, wherein the apparatus is further configured to send instructions regarding made service requests to the at least one person guided to the received destination.

* * * * *